United States Patent
Abe et al.

(10) Patent No.: US 11,886,753 B2
(45) Date of Patent: Jan. 30, 2024

(54) MAGNETIC DISK DEVICE AND METHOD OF ORDERING COMMANDS BASED ON SELECTED SCALE

(71) Applicants: Kabushiki Kaisha Toshiba, Tokyo (JP); Toshiba Electronic Devices & Storage Corporation, Tokyo (JP)

(72) Inventors: Takao Abe, Yokohama Kanagawa (JP); Tatsuo Nitta, Tokyo (JP); Takeshi Hara, Kamakura Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 6 days.

(21) Appl. No.: 17/687,175

(22) Filed: Mar. 4, 2022

(65) Prior Publication Data
US 2023/0092825 A1   Mar. 23, 2023

(30) Foreign Application Priority Data
Sep. 22, 2021   (JP) .................. 2021-153994

(51) Int. Cl.
*G06F 3/06* (2006.01)
(52) U.S. Cl.
CPC .......... *G06F 3/0676* (2013.01); *G06F 3/0611* (2013.01); *G06F 3/0659* (2013.01)
(58) Field of Classification Search
CPC ..... G06F 3/0676; G06F 3/0611; G06F 3/0659
See application file for complete search history.

(56) References Cited

U.S. PATENT DOCUMENTS

| | | | |
|---|---|---|---|
| 9,311,939 B1 | 4/2016 | Malina et al. | |
| 9,536,563 B1* | 1/2017 | Liu | G06F 11/1469 |
| 9,864,529 B1* | 1/2018 | Chen | G06F 3/0643 |
| 10,372,375 B2 | 8/2019 | Iwashiro | |
| 2015/0237138 A1* | 8/2015 | Malina | G06F 3/067 360/75 |
| 2021/0011842 A1* | 1/2021 | Lee | G11C 16/10 |
| 2021/0056989 A1 | 2/2021 | Tsuruoka et al. | |

FOREIGN PATENT DOCUMENTS

JP    2021-034079 A    3/2021

* cited by examiner

*Primary Examiner* — Chie Yew
(74) *Attorney, Agent, or Firm* — Allen & Overy LLP

(57) ABSTRACT

A controller provides a plurality of first sections with numerical information on a first scale. The plurality of first sections are obtained by dividing a recording surface of a magnetic disk in units of first memory areas in each of which a first volume of data can be written by an SMR method. The first scale corresponds to a sequence of the first sections. The controller provides a plurality of second sections with numerical information on a second scale. The plurality of second sections are obtained by dividing the recording surface of the magnetic disk in units of second memory areas in each of which the first volume of data can be written by a CMR method. The second scale corresponds to a sequence of the second sections. The controller executes a plurality of commands in order based on a numerical information on the first scale or the second scale.

19 Claims, 11 Drawing Sheets

MAGNETIC DISK DEVICE AND METHOD OF ORDERING COMMANDS BASED ON SELECTED SCALE

CROSS-REFERENCE TO RELATED APPLICATIONS

This application is based upon and claims the benefit of priority from Japanese Patent Application No. 2021-153994, filed on Sep. 22, 2021; the entire contents of which are incorporated herein by reference.

FIELD

Embodiments described herein relate generally to a magnetic disk device and a method.

BACKGROUND

Some recent magnetic disk devices, when receiving a plurality of commands from a host, perform a reordering operation so that the order in which the plurality of commands are to be executed is rearranged differently from the order in which the commands have been received. This reordering operation shortens the total moving distance of a magnetic head, thereby improving the efficiency of access to a magnetic disk.

DETAILED DESCRIPTION

Figure 1:
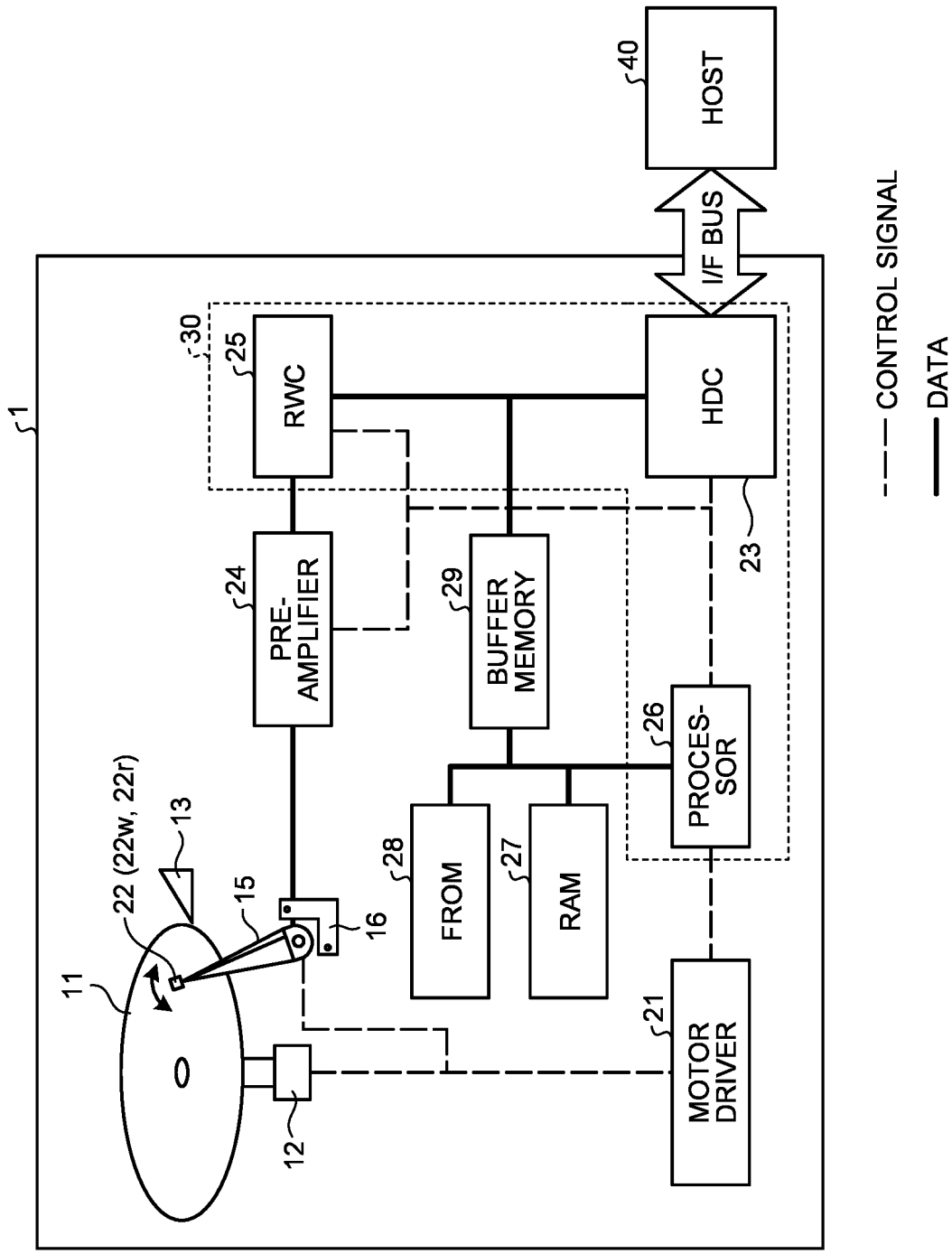
FIG. 1 is a diagram illustrating an example of a configuration of a magnetic disk device according to a first embodiment.

According to an embodiment, a magnetic disk device is connectable to a host. The magnetic disk device includes: a magnetic disk having a recording surface; a magnetic head that accesses the recording surface; and a controller. The controller sets one or more first sections out of a plurality of first sections obtained by dividing the recording surface in a radial direction in units of first memory areas in each of which a first volume of data can be written by a shingled magnetic recording (SMR) method, as a first storage area in which data is to be written by the SMR method. The controller provides each of the plurality of first sections with numerical information on a first scale corresponding to a sequence in which the plurality of first sections are arranged in the radial direction. The controller sets one or more second sections out of a plurality of second sections obtained by dividing the recording surface in the radial direction in units of second memory areas in each of which the first volume of data can be written by a conventional magnetic recording (CMR) method, as a second storage area in which data is to be written by the CMR method. The controller provides each of the plurality of second sections with numerical information on a second scale corresponding to a sequence in which the plurality of second sections are arranged in the radial direction. When a plurality of commands, each of which is a command that requests access to one of the first storage area and the second storage area, are received from a host, the controller selects one of the first scale and the second scale and converts numerical information provided to sections to be accessed in accordance with the respective commands into numerical information on a third scale, which is the selected scale. The controller then executes the plurality of commands in order based on the numerical information on the third scale which has been obtained by converting the numerical information provided to the sections to be accessed.

A description will be given below in detail of a magnetic disk device and a method according to some embodiments with reference to the accompanying drawings. It should be noted that these embodiments are not intended to limit the present invention.

First Embodiment

Known methods of writing data on a magnetic disk include methods referred to as SMR and CMR. These methods are collectively referred to as recording methods. Details of SMR and CMR will be described later.

In the first embodiment, an area in which data is to be written by the SMR method and an area in which data is to be written by the CMR method can be defined on a recording surface of a magnetic disk. A description will be given of a magnetic disk device that can perform the reordering operation in a short time even if both an area in which data is to be written by the SMR method and an area in which data is to be written by the CMR method are defined on a recording surface of a magnetic disk.

Herein, an area in which data is to be written by the SMR method is referred to as an SMR storage area. The SMR storage area is an example of a first storage area. An area where data is to be written by the CMR method is referred to as a CMR storage area. The CMR storage area is an example of a second storage area.

Details of a magnetic disk device according to the first embodiment will be described below. The magnetic disk device according to the first embodiment is referred to as a magnetic disk device 1.

FIG. 1 is a diagram illustrating an example of a configuration of the magnetic disk device 1 according to the first embodiment.

The magnetic disk device 1 is connected to a host 40. The magnetic disk device 1 can receive access commands from the host 40. These access commands include a write command for requesting writing of data and a read command for requesting reading of data.

The magnetic disk device 1 includes one or more magnetic disks 11. To facilitate understanding, the magnetic disk device 1 includes a single magnetic disk 11 as illustrated in FIG. 1. The magnetic disk device 1 accesses the magnetic disk 11 in response to an access command. The access to the magnetic disk 11 involves writing of data on the magnetic disk 11 or reading of data from the magnetic disk 11.

The magnetic disk device 1 accesses the magnetic disk 11 via the magnetic head 22. More specifically, in addition to the magnetic disk 11, the magnetic disk device 1 includes a spindle motor 12, a ramp 13, an actuator arm 15, a voice coil motor (VCM) 16, a motor driver 21, a magnetic head 22, a hard disk controller (HDC) 23, a preamplifier 24, a read/write channel (RWC) 25, a processor 26, random access memory (RAM) 27, flash read-only memory (FROM) 28, and buffer memory 29.

The magnetic disk 11 is rotated about a rotation axis by the spindle motor 12 at a predetermined rotation speed. The rotation of the spindle motor 12 is driven by the motor driver 21.

The magnetic head 22 includes a write head 22w and a read head 22r to access the magnetic disk 11. The write head 22w writes data on the magnetic disk 11. The read head 22r reads data from the magnetic disk 11. The magnetic head 22 is attached to an end of the actuator arm 15. The magnetic head 22 is moved in radial directions of the magnetic disk 11 by the VCM 16, which is driven by the motor driver 21. When the magnetic disk 11 stops rotating, for example, the magnetic head 22 moves to a location above the ramp 13.

When data is read from the magnetic disk 11, the preamplifier 24 amplifies and outputs a signal read from the magnetic disk 11, thereby supplying the signal to the RWC 25. In addition, the preamplifier 24 amplifies a signal related to data to be written which has been supplied from the RWC 25 and supplies the signal to the magnetic head 22.

The HDC 23 controls transmission of data to the host 40 or reception of data from the host 40 via an I/F bus, controls the buffer memory 29, and performs a process of correcting errors contained in read data, for example.

The buffer memory 29 temporarily stores various types of information.

Figure 2:
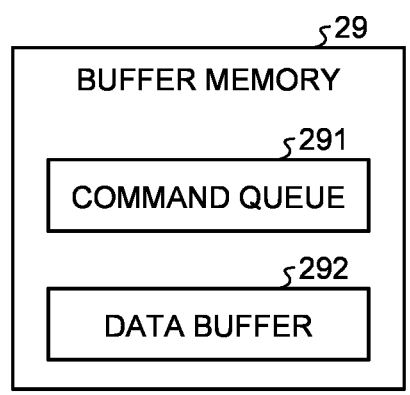
FIG. 2 is a schematic diagram illustrating an example of a configuration of buffer memory according to the first embodiment.

FIG. 2 is a schematic diagram illustrating an example of a configuration of the buffer memory 29 according to the first embodiment. As illustrated in this drawing, the buffer memory 29 includes a command queue 291 and a data buffer 292.

The data buffer 292 is a buffer area in which data to be transferred from the magnetic disk device 1 to the host 40 or data received from the host 40 is temporarily stored.

The command queue 291 is a queue-structured area in which access commands received from the host 40 are stored. One or more access commands stored in the command queue 291 are sequentially executed. The command queue 291 does not necessarily have to be formed in the buffer memory 29. Alternatively, for example, the command queue 291 may be formed in a RAM 27, which will be described later.

For example, the buffer memory 29 is implemented by volatile memory that can operate at a high speed. The type of memory that implements the buffer memory 29 is not limited to a specific one. For example, the buffer memory 29 may be implemented by dynamic random access memory (DRAM), static random access memory (SRAM), or a combination thereof.

Referring to FIG. 1 again, the description is continued.

The RWC 25 code-modulates data to be written which has been supplied from the HDC 23 and then supplies this data to the preamplifier 24. In addition, the RWC 25 code-demodulates a signal that has been read from the magnetic disk 11 and supplied from the preamplifier 24 and then outputs this signal to the HDC 23 as digital data.

The processor 26 is a central processing unit (CPU), for example. The processor 26 is connected to the RAM 27, the flash read-only memory (FROM) 28, and the buffer memory 29.

For example, the RAM 27 is implemented by DRAM, SRAM, or a combination thereof. The RAM 27 is used by the processor 26 as operation memory. The RAM 27 is used as an area in which a firmware program is loaded or in which various types of management data are stored.

The FROM 28 is nonvolatile memory. The processor 26 performs overall control of the magnetic disk device 1 in accordance with firmware programs prestored in the FROM 28 and the magnetic disk 11. For example, the processor 26 loads the firmware programs that have been prestored in the FROM 28 and the magnetic disk 11 into the RAM 27. In accordance with the loaded firmware programs, the processor 26 then controls the motor driver 21, the preamplifier 24, the RWC 25, the HDC 23, and other components.

The configuration including the HDC 23, the RWC 25, and the processor 26 may be regarded as a controller 30. The controller 30 may include any other component, such as the RAM 27, the FROM 28, or the buffer memory 29.

Figure 3:
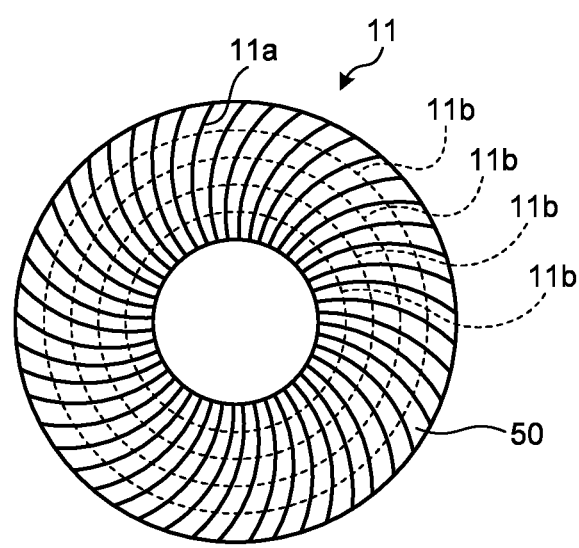
FIG. 3 is a diagram illustrating an example of a configuration of a magnetic disk according to the first embodiment.

FIG. 3 is a diagram illustrating an example of a configuration of the magnetic disk 11 according to the first embodiment. Servo information has been written on a recording surface 50 formed on a surface of the magnetic disk 11, for example, by a servo writer or other device before shipment. The servo information contains sector/cylinder information and a burst pattern. The sector/cylinder information specifies servo addresses on the magnetic disk 11 in circumferential and radial directions thereof. The sector/cylinder information is used for seek control under which the magnetic head 22 moves to a target track. The burst pattern is used for tracking control under which the magnetic head 22 is kept on the target track. The servo information may have been written on the magnetic disk 11 by self-servo write (SSW) system after shipment. FIG. 3 illustrates a radial arrangement of servo regions 11a, which is an example of an arrangement of servo regions in which the servo information has been written.

The recording surface 50 of the magnetic disk 11 is provided with a plurality of concentric tracks 11b having different radii, which are formed concentrically at predetermined intervals (also referred to as track pitches). Many sectors are continuously formed on each track 11b. The magnetic head 22 writes data on each sector or reads data therefrom.

Figure 4:
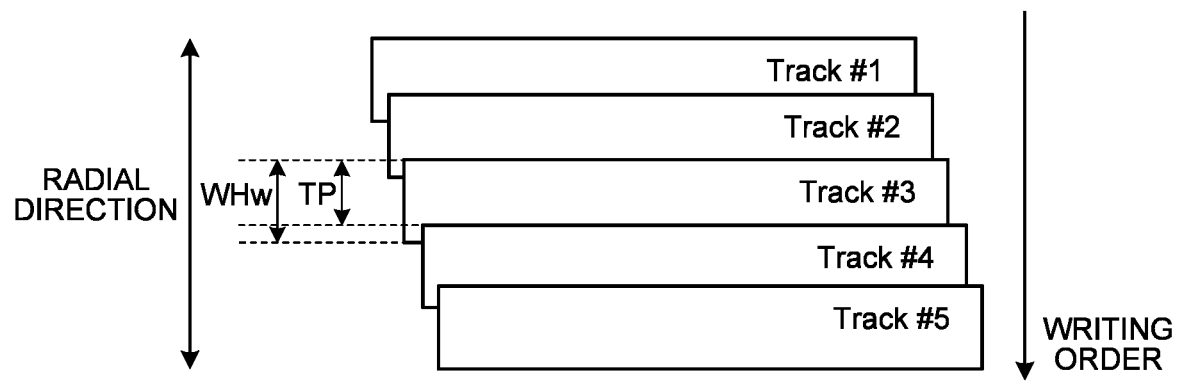
FIG. 4 is a schematic diagram for explaining an SMR method, which is one of the recording methods used in the magnetic disk device according to the first embodiment.
Figure 5:
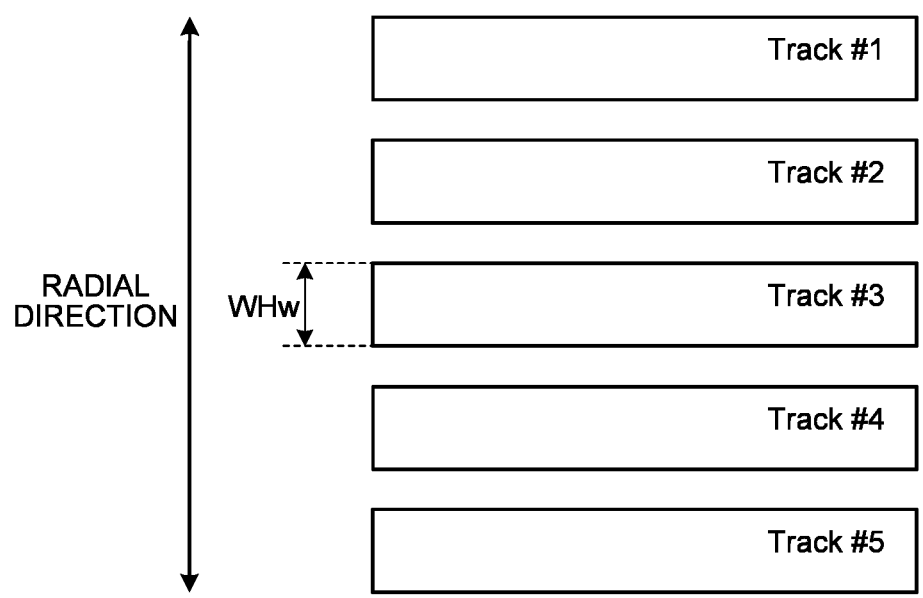
FIG. 5 is a schematic diagram for explaining a CMR method, which is another one of the recording methods used in the magnetic disk device according to the first embodiment.

The arrangement of the plurality of tracks 11b depends on the recording method employed. With reference to FIGS. 4 and 5, the SMR method and the CMR method will be described below.

FIG. 4 is a schematic diagram for explaining an SMR method, which is one of the recording methods used in the magnetic disk device 1 according to the first embodiment. When the SMR method is used to write data (referred to as first data) for a certain track and then to write data (referred to as second data) for another track adjacent to the track which the first data is written in the radial direction, individual tracks are formed such that the second data overlaps the first data. In short, according to the SMR method, data is written on the magnetic disk 11 so that the data on one of two tracks adjacent to each other in the radial direction overlaps the data on the other track.

For example, the data is written on a track #2 so as to overlap data that has already been written on a track #1. Furthermore, data is written on a track #3 so as to overlap the data that has already been written on the track #2. According to the SMR method, data is repeatedly written on tracks so that data on one track overlaps data that has already been written on a track adjacent to this track.

In this way, a width of each track, namely, a track pitch TP is formed so as to be smaller than a width (WHw) of the write head 22w of the magnetic head 22, which results in an improved recording density.

In the SMR method, however, when part of data written on a plurality of tracks is updated, data on a track which is adjacent to the updated data may be damaged because the track pitch TP is smaller than the width WHw of the write head 22w. To prevent damage to data, according to the SMR method, data written on a plurality of tracks which contains the part of the data is updated in one batch. An area made of a plurality of tracks to be updated in one batch may be referred to as a band. The volume of data that can be written on one band, namely, one band size is common to all bands.

FIG. 5 is a schematic diagram for explaining a CMR method, which is another one of the recording methods used in the magnetic disk device 1 according to the first embodiment. According to the CMR method, as illustrated in this drawing, individual tracks are formed so that adjacent tracks in the radial direction do not overlap each other. In short, the CMR method is a method in which respective pieces of data are written on two tracks adjacent to each other in the radial direction of the magnetic disk 11 so as not to overlap each other. The CMR method enables update of data at any location because the width of each track is the same as the width (WHw) of the write head 22w. Therefore, the CMR method provides a high random access performance, although its recording density is lower than the recording density of the SMR method.

The controller 30 can dynamically change defining of an area, namely, an SMR storage area, in which data is to be written by the SMR method. The controller 30 defines an SMR storage area on the recording surface 50 and opens the defined SMR storage area. "Open the defined SMR storage area" means that an area that has been defined as an SMR storage area is set to a state where this area can be re-defined as an SMR storage area (or a CMR storage area that will be described later). Hereinafter, "define an area on the recording surface 50 as an SMR storage area (or a CMR storage area)" will be expressed as "allocate an SMR storage area (or a CMR storage area) to an area on the recording surface 50". "Open the defined SMR storage area (or CMR storage area)" will be expressed as "deallocate an SMR storage area (or CMR storage area)".

Figure 6:
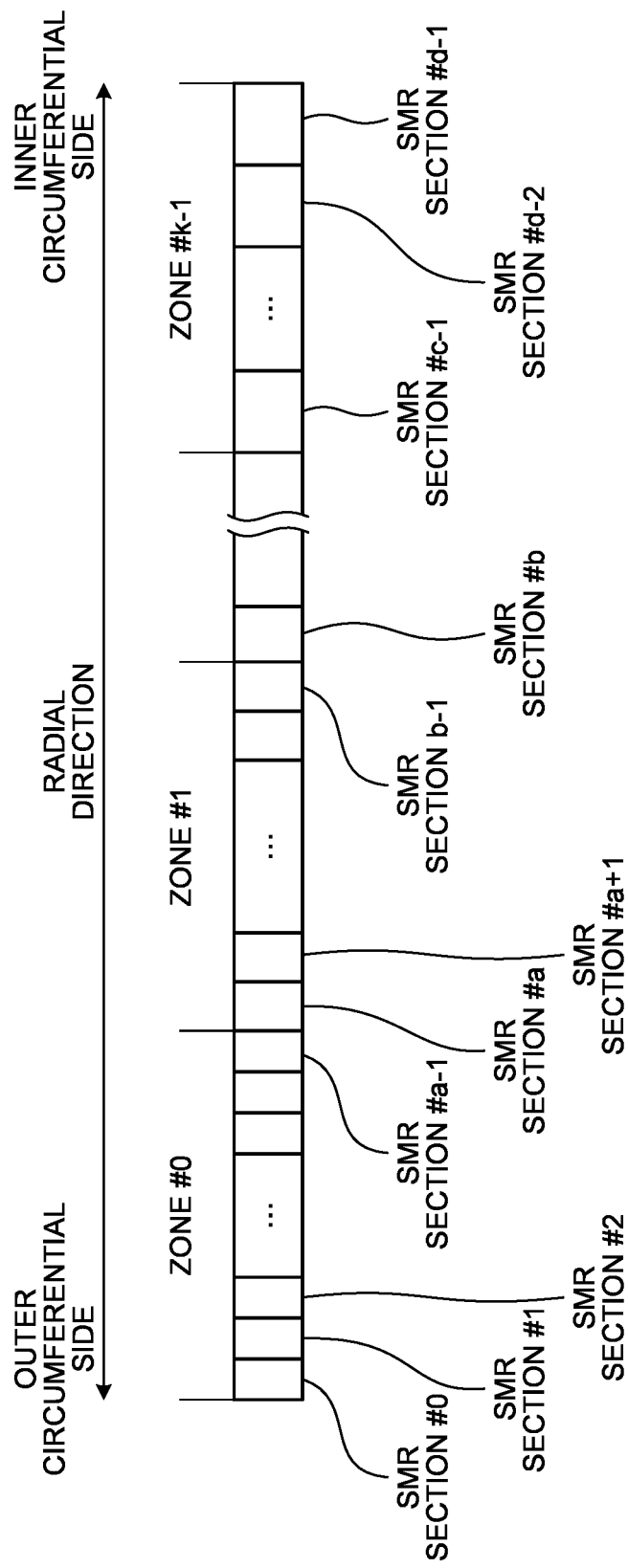
FIG. 6 is a schematic diagram for describing a location at which an SMR storage area according to the first embodiment can be allocated.

FIG. 6 is a schematic diagram for describing a location at which an SMR storage area according to the first embodiment can be allocated. According to an example illustrated in this drawing, the recording surface 50 is divided into a plurality of zones in the radial direction. In this example, the recording surface 50 is divided into a K number of zones (zones #0, #1, . . . , and #K−1). Each zone is a minimum unit for which the recording density can be individually set. In short, the recording density is uniform inside each zone, but the recording densities of two zones may differ from each other. In this case, the recording density depends on the combination of the setting of a track pitch and the setting of a bit pitch.

Each zone is further divided into a plurality of sections. Each section is referred to as an SMR section. Each SMR section has enough capacity to be able to write data of a band size thereon when data is written by the SMR method.

The capacity in which data can be written on one track 11b decreases toward an inner circumferential side of the recording surface 50. For this reason, toward the inner circumferential side of the recording surface 50, the number of tracks in an SMR section increases, and thus the width of the SMR section in the radial direction increases. Since the recording density is uniformly set for each zone, the widths of SMR sections in each zone are the same as one another.

The controller 30 provides SMR sections with respective numbers corresponding to the sequence in which all SMR sections are arranged in the radial direction. These numbers are referred to as SMR section numbers. According to the example illustrated in FIG. 6, the SMR section positioned closest to the outer circumferential side is provided with an SMR section number #0. Then, the other SMR sections are provided with respective SMR section numbers that are integers proportional to offsets from the SMR section provided with the SMR section number #0.

A method of providing SMR section numbers is, however, not limited to the above. For example, the SMR section positioned closest to the inner circumferential side may be provided with the SMR section number #0. Then, the other SMR sections may be provided with respective SMR section numbers that are integers proportional to offsets from the SMR section provided with the SMR section number #0.

Each SMR section number can be regarded as numerical information that indicates a location in the radial direction on a scale in units of the widths of SMR sections. Each SMR section number regarded as the numerical information is expressed as the numerical information on the SMR scale. The numerical information on the SMR scale is an example of numerical information on a first scale. Hereinafter, an SMR section provided with an SMR section number #X (X is integer equal to or more than 0) is sometimes referred to as an SMR section #X.

The controller 30 allocates or deallocates an SMR storage area in units of SMR sections. In this case, the boundaries of the SMR storage areas are aligned with the boundaries of the SMR sections.

The controller 30 can further dynamically change the defining of an area, namely, a CMR storage area, in which data is to be written by the CMR method. The controller 30 allocates a CMR storage area to the recording surface 50 or deallocates a CMR storage area. Similar to the SMR storage areas, the controller 30 can allocate or deallocate CMR storage areas in units of memory areas having the same size as the band size in the SMR.

Figure 7:
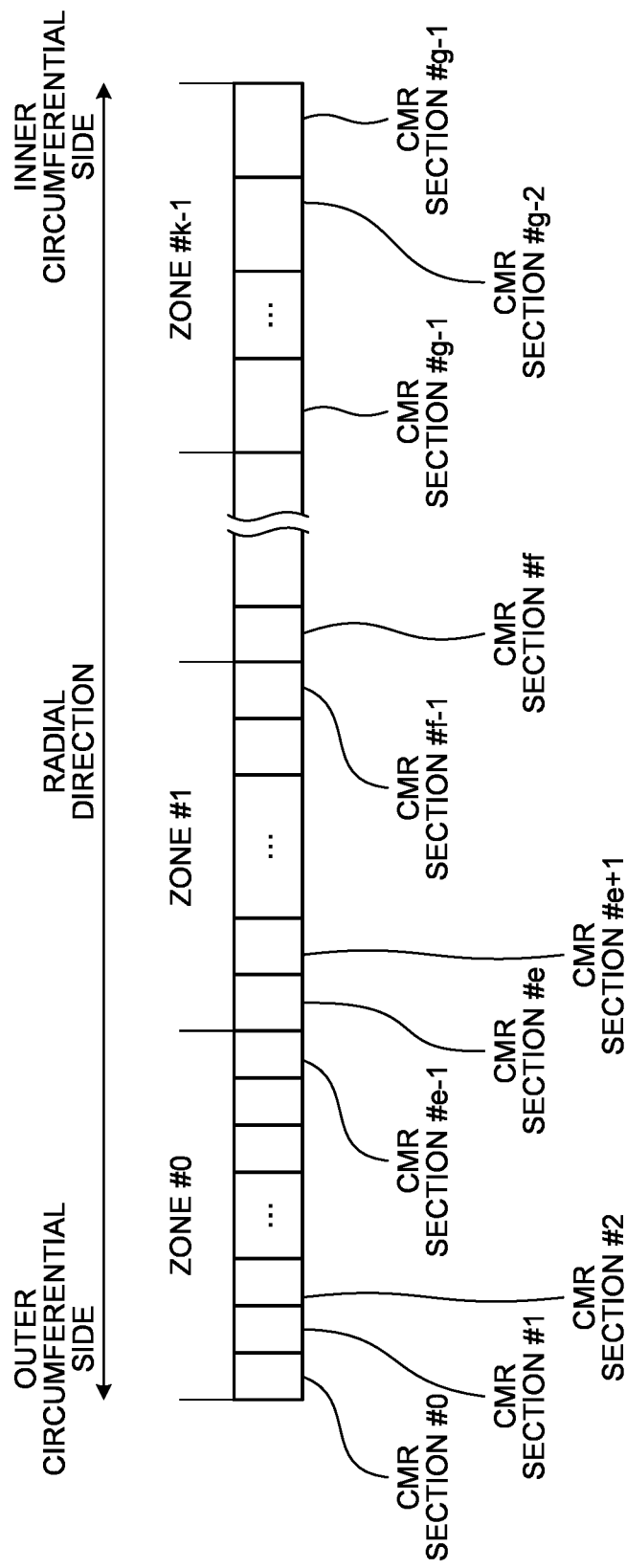
FIG. 7 is a schematic diagram for describing a location at which a CMR storage area according to the first embodiment can be allocated.

FIG. 7 is a schematic diagram for describing a location at which a CMR storage area according to the first embodiment can be allocated.

According to an example illustrated in FIG. 7, each zone is divided into a plurality of sections. Each section is referred to as a CMR section. Each CMR section has an enough capacity to be able to write data having the same size as the band size in the SMR method when data is written by the CMR method.

The width of the CMR section in the radial direction also increases toward the inner circumferential side of the recording surface 50. Since the recording density is uniformly set for each zone, the widths of CMR sections in each zone are the same as one another.

The controller 30 provides CMR sections with respective numbers corresponding to the sequence in which all CMR sections are arranged in the radial direction. These numbers are referred to as CMR section numbers. According to the example illustrated in FIG. 7, the CMR section positioned closest to the outer circumferential side is provided with a CMR section number #0. Then, the other CMR sections are provided with respective CMR section numbers that are integers proportional to offsets from the CMR section provided with the CMR section number #0. Hereinafter, a CMR section provided with a SMR section number #X (X is integer equal to or more than 0) is sometimes referred to as a CMR section #X.

As long as the CMR section #0 and the SMR section #0, each of which is a reference of section numbers, are positioned at the same location in the radial direction, a method of providing CMR section numbers is not limited to the above. For example, if the SMR section number #0 is provided to the SMR section positioned closest to the inner circumferential side, the CMR section number #0 is also provided to the CMR section positioned closest to the inner circumferential side.

Each CMR section number can be regarded as numerical information that indicates a location in the radial direction on a scale in units of the widths of CMR sections. Each CMR section number regarded as the numerical information is expressed as the numerical information on the CMR scale. The numerical information on the CMR scale is an example of numerical information on a second scale.

The controller 30 allocates or deallocates a CMR storage area in units of CMR sections. In this case, the boundaries of the CMR storage areas are aligned with the boundaries of the CMR sections.

As described above, the SMR method can make the track pitch smaller than the track pitch in the CMR method. Therefore, when an SMR section is compared with a CMR section in the same zone, the SMR section has a smaller width than the CMR section. Moreover, the number of SMR sections is larger than the number of CMR sections in the same zone.

Figure 8:
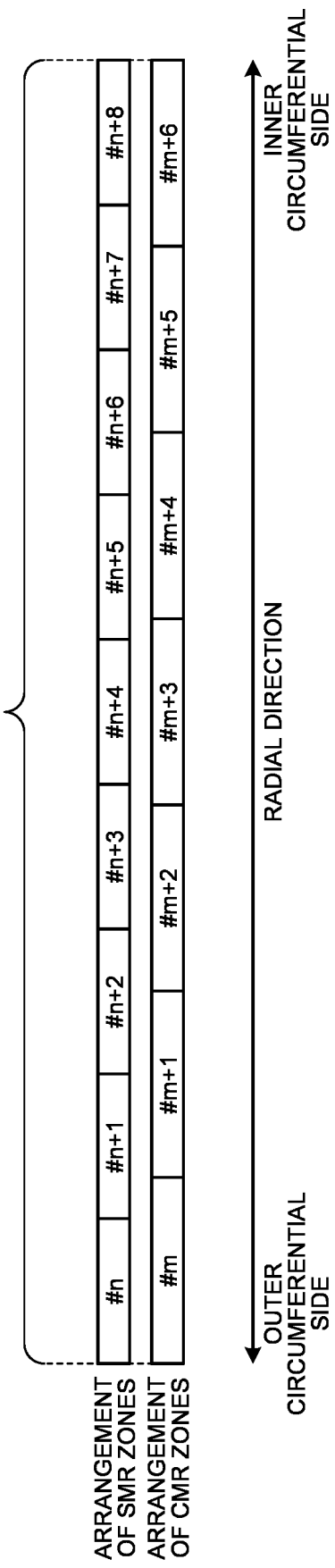
FIG. 8 is a schematic diagram for explaining a difference in arrangement between SMR sections and CMR sections according to the first embodiment.

FIG. 8 is a schematic diagram for explaining a difference in arrangement between SMR sections and CMR sections according to the first embodiment. This drawing illustrates the arrangements of SMR sections and CMR sections in a zone #i (i is integer in the range from 0 to K−1), which is one of a K number of zones.

According to the example illustrated in FIG. 8, nine SMR sections #n to #n+8 are arranged in this order within the zone #i. Furthermore, seven CMR sections #m to #m+6 are arranged in this order within the zone #i. It can be seen from this drawing that the boundaries of the SMR sections and the CMR sections are misaligned from one another.

The controller 30 allocates an SMR storage area and a CMR storage area in a mutually exclusive manner. More specifically, if a CMR section overlaps an area that has already been allocated as an SMR storage area, the controller 30 cannot allocate this CMR section as a CMR storage area. Likewise, if an SMR section overlaps an area that has already been allocated as a CMR storage area, the controller 30 cannot allocate this SMR section as an SMR storage area.

As described above, the boundaries are misaligned from one another between the arrangements of the SMR sections and the CMR sections. Thus, gaps may be formed between the SMR storage areas and the CMR storage areas. Such gaps are referred to as unused areas (referred to below as unused areas 80). An unused area is an area allocated to neither the SMR storage area nor the CMR storage area. The unused area is not used as a storage.

Figure 9:
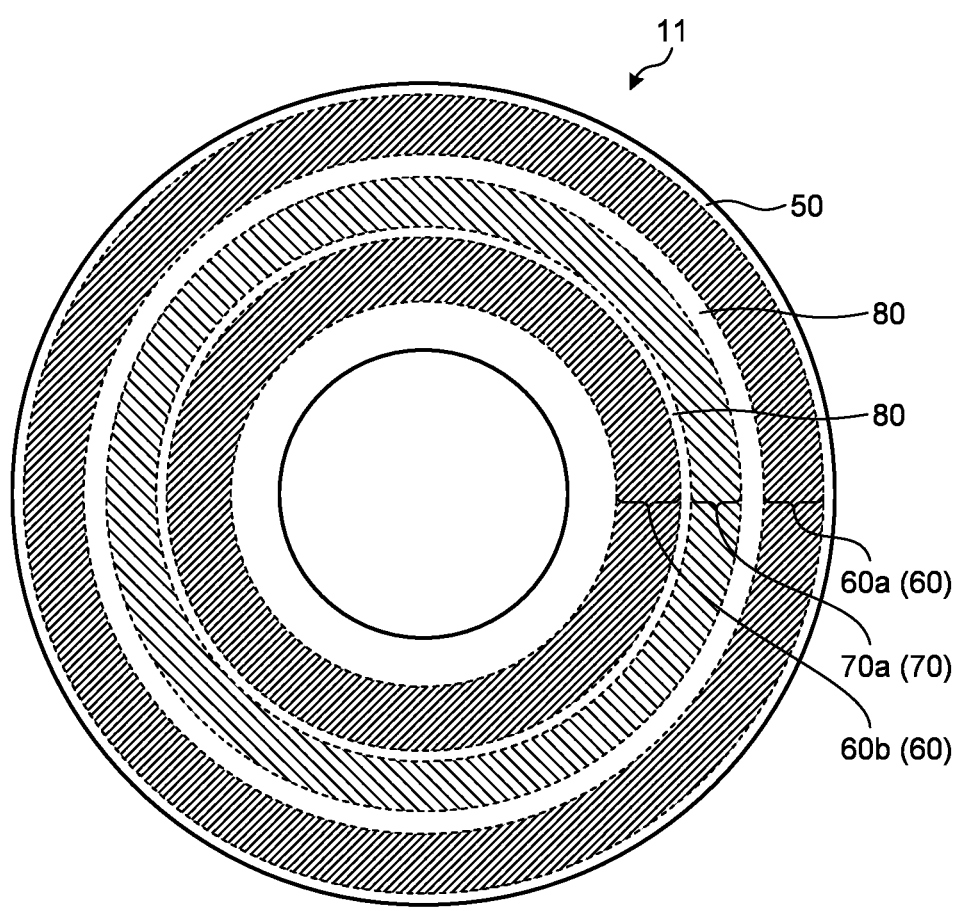
FIG. 9 is a schematic diagram illustrating an example of allocating SMR storage areas and a CMR storage area on the magnetic disk according to the first embodiment.

FIG. 9 is a schematic diagram illustrating an example of allocating SMR storage areas and a CMR storage area on the magnetic disk 11 according to the first embodiment.

As described above, the controller 30 may dynamically allocate SMR storage areas and CMR storage areas. Thus, SMR storage areas 60 and CMR storage areas 70 are present together on the recording surface 50 of the magnetic disk 11. In an example illustrated in FIG. 9, an SMR storage area 60a, a CMR storage area 70a, and an SMR storage area 60a are allocated in this order from the outer circumferential side.

Areas between the SMR storage area 60a and the CMR storage area 70a and between the CMR storage area 70a and the SMR storage area 60b are handled as unused areas 80, which are not used as storages.

Each of the SMR storage areas 60a and 60b is an area in which one or more SMR sections provided with sequential SMR section numbers are collectively allocated as an SMR storage area. Likewise, the CMR storage area 70a is an area in which one or more CMR sections provided with sequential CMR section numbers are collectively allocated as a CMR storage area.

Figure 10:
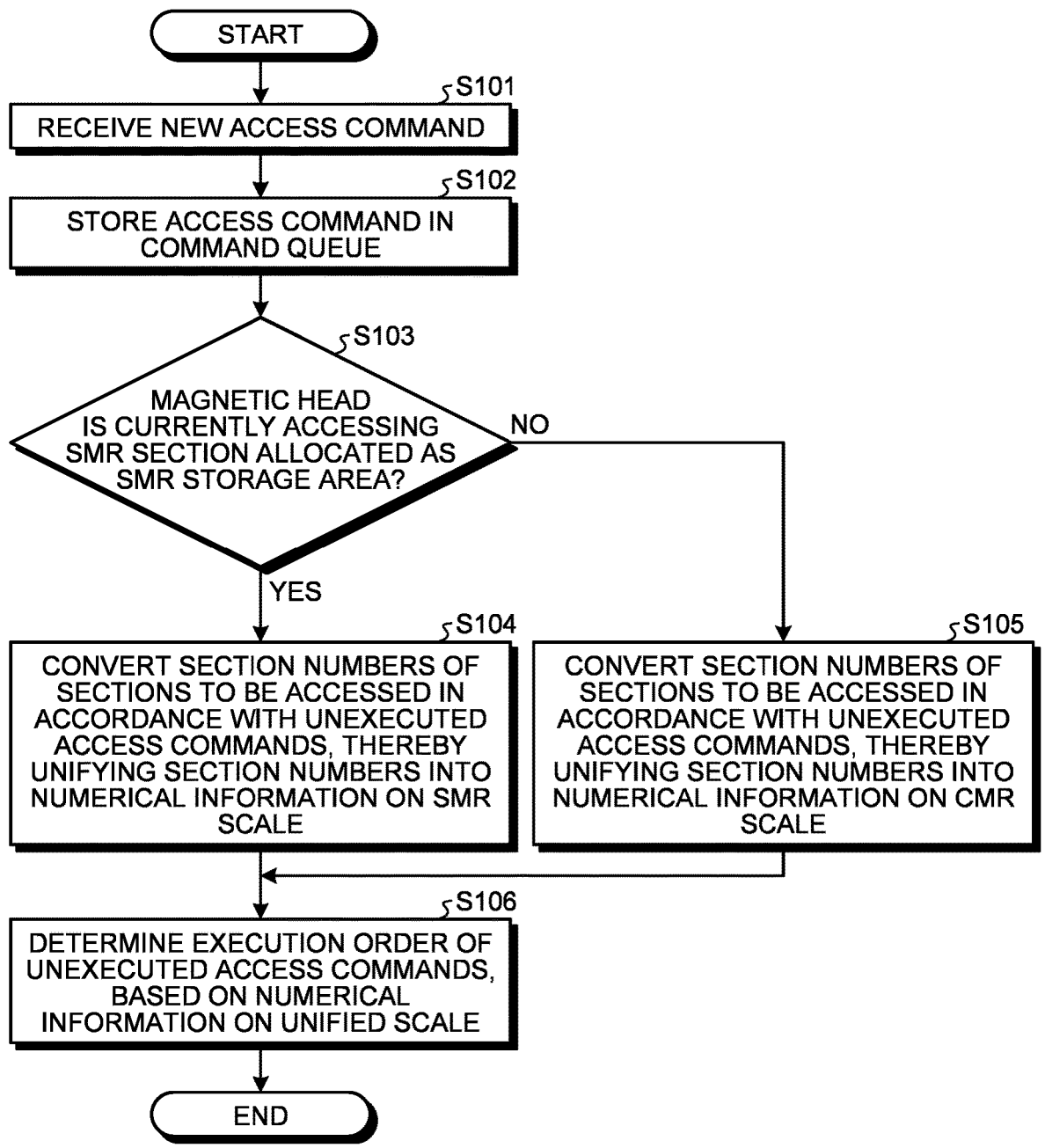
FIG. 10 is a flowchart of an example of a reordering operation according to the first embodiment.

FIG. 10 is a flowchart of an example of a reordering operation according to the first embodiment.

When a new access command is received from the host 40 (S101), the controller 30 stores this access command in the command queue 291 (S102).

Then, the controller 30 determines whether the magnetic head 22 is currently accessing an SMR section that has been allocated as an SMR storage area (S103).

When the magnetic head 22 is accessing an SMR section that has been allocated as an SMR storage area at the timing of the process S103 (S103: Yes), the controller 30 converts section numbers of sections to be accessed in accordance with unexecuted access commands in the command queue 291, thereby unifying the section numbers into numerical information on the SMR scale (S104).

For example, the volume of data that can be written in a unit area of the magnetic disk 11 by the SMR method is denoted by Vsmr. The volume of data that can be written in the same unit area by the CMR method is denoted by Vcmr. In this case, the unit area may be one zone or the entire recording surface 50 of the magnetic disk 11. The ratio R1 of the width of the SMR section to the width of the CMR section is given by the following equation (1).

$$R1 = Vcmr/Vsmr \qquad (1)$$

According to the example illustrated in FIG. 8, for example, data for nine bands can be written in the zone #i by the SMR method, and data for seven bands can be written in the zone #i by the CMR method. Therefore, R1 is determined to be 7/9.

It should be noted that the recording density can vary from zone to zone. However, the ratio between the volume of data that can be written by the SMR and the volume that can be written by the CMR method becomes constant, independently of the zone. In short, R1 has the same value for any zone.

A section to be accessed in accordance with a certain access command is a CMR section that has been allocated as a CMR storage area, and the section number of the CMR section is Ncmr. In this case, the controller 30 converts Ncmr into numerical information Nsmr on the SMR scale by using the following equation (2).

$$Nsmr=Ncmr/R1 \quad (2)$$

In the above case, the SMR section number corresponds to numerical information on the SMR scale. Thus, when the section to be accessed in accordance with the certain access command is an SMR section that has been allocated as an SMR storage area, the controller 30 does not convert the section number of the SMR section.

As a result of the conversion described above, the locations of the sections to be accessed in accordance with a plurality of access commands can be evaluated by numerical information on a unified scale, in this case, numerical information on the SMR scale. Thus, even when a CMR section is included in access destinations related to unexecuted access commands, the controller 30 can evaluate a location relationship between the access destinations, such as distances between the access destinations.

When the magnetic head 22 is accessing a CMR section that has been allocated as a CMR storage area instead of an SMR section that has been allocated as an SMR storage area at the timing of the process of S103 (S103: No), the controller 30 converts the section numbers of the sections to be accessed in accordance with the unexecuted access command in the command queue 291, thereby unifying the section numbers into the numerical information on the CMR scale (S105).

More specifically, when the section to be accessed in accordance with a certain access command is an SMR section that has been allocated as an SMR storage area and the section number of the SMR section is Nsmr, the controller 30 converts Nsmr into numerical information Ncmr on the CMR scale by using the following Formula (3).

$$Ncmr=Nsmr \times R1 \quad (3)$$

In the above case, the CMR section number corresponds to numerical information on the CMR scale. Therefore, when the section to be accessed in accordance with the certain access command is a CMR section that has been allocated as a CMR storage area, the controller 30 does not convert the section number of the CMR section.

As a result of the conversion described above, the locations of the sections to be accessed in accordance with a plurality of access commands can be evaluated by numerical information on a unified scale, or numerical information on the CMR scale in this case. Thus, even when an SMR section is included in sections to be accessed in accordance with the unexecuted access commands, the controller 30 can evaluate a location relationship between the access destinations, such as distances between the access destinations.

After S104 or S105, the controller 30 determines the order in which the unexecuted access commands in the command queue 291 are to be executed, based on the numerical information on the unified scale (S106). The controller 30 then terminates the reordering operation.

At S106, the controller 30 can determine the execution order of access commands by using any given method and based on numerical information on a unified scale.

As an example, the controller 30 selects, as the moving destination of the magnetic head 22, the section closest to a current location of the magnetic head 22 from among the sections to be accessed in accordance with a plurality of access commands. Then, the controller 30 selects another destination close to the selected section, as the next moving destination of the magnetic head 22. After that, the controller 30 repeats operations of selecting a section close to the selected section as the next moving destination, thereby calculating a moving route along which the magnetic head 22 will access all the sections to be accessed in accordance with the plurality of access commands. Then, the controller 30 determines the order in which the plurality of access commands are to be executed so that the magnetic head 22 moves along the moving route obtained by the calculation.

As another example, the controller 30 may perform a complicated calculation so that the total moving distance of the magnetic head 22 becomes the shortest.

As described above, a zone closer to the inner circumferential side has sections with a larger width. Thus, to more closely relate numerical information on a unified scale which indicates the location of each section to be accessed to an actual location, the controller 30 may correct the numerical information on the unified scale which indicates the location of each section to be accessed, in accordance with the zone in which each section to be accessed is positioned. Then, the controller 30 may determine the execution order of the plurality of access commands, based on the corrected numerical information. In this case, the designer can optionally determine whether to correct the numerical information on the unified scale which indicates sections to be accessed.

The controller 30 executes the unexecuted access commands in the command queue 291 in the determined order until a new access command has been received from the host 40.

Figure 11:
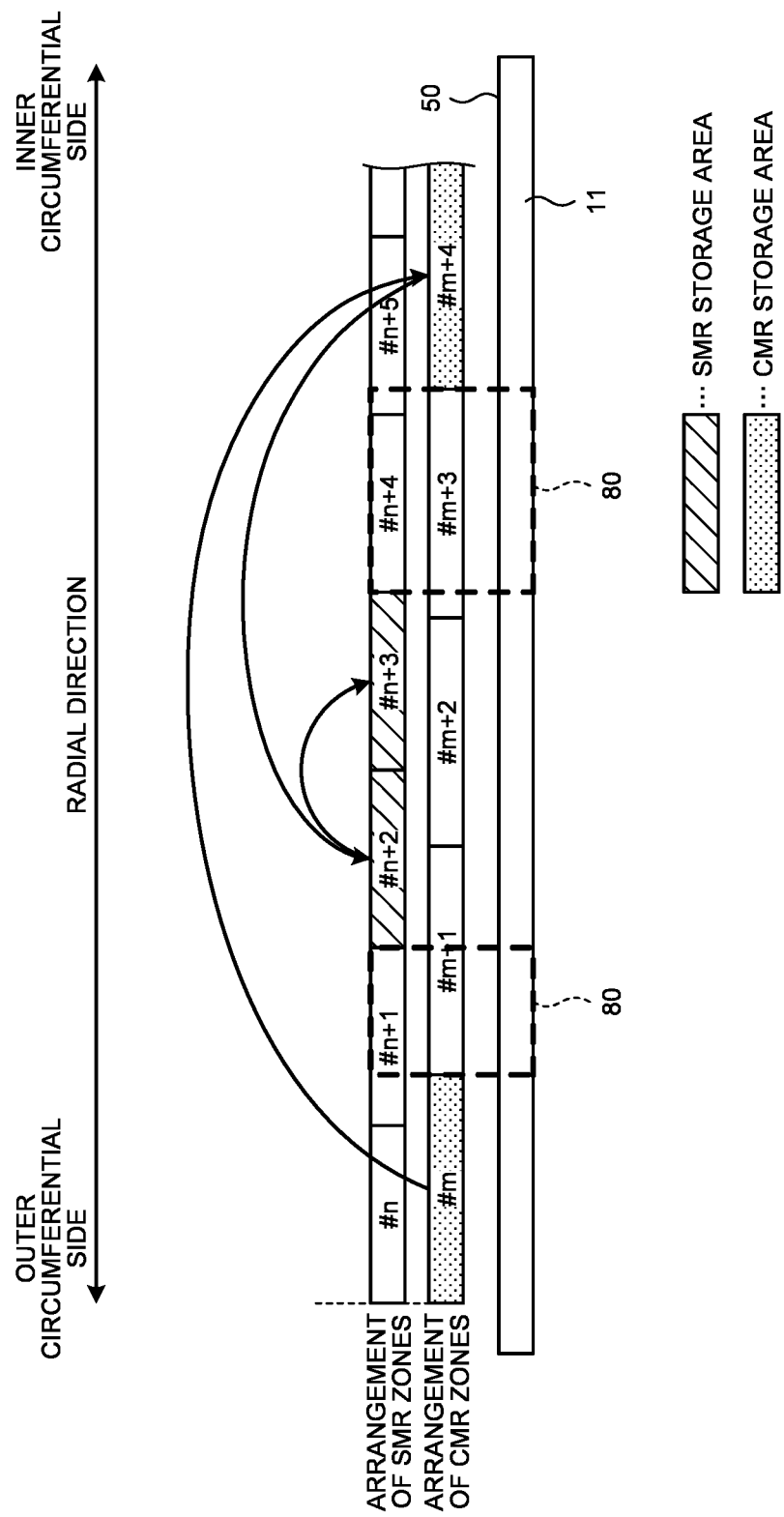
FIG. 11 is a schematic diagram illustrating an example of an order in which a plurality of access commands are to be executed before the reordering operation according to the first embodiment is performed.
Figure 12:
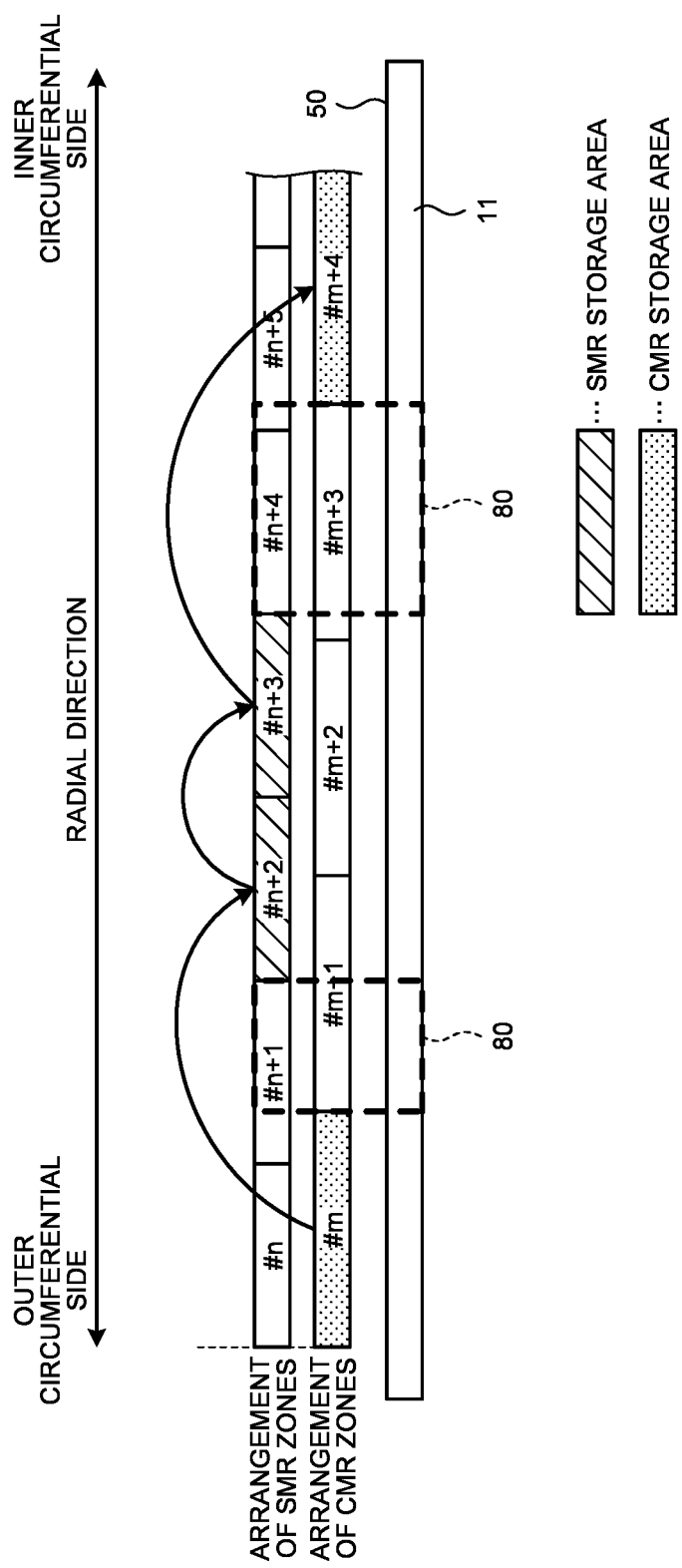
FIG. 12 is a schematic diagram illustrating an example of an order in which a plurality of access commands are to be executed after the reordering operation according to the first embodiment is performed.

With reference to FIGS. 11 and 12, a description will be given of a concrete example of the reordering operation according to the first embodiment.

FIG. 11 is a schematic diagram illustrating an example of an order in which a plurality of access commands are to be executed before the reordering operation according to the first embodiment is performed. An example illustrated in this drawing employs the arrangements of the SMR sections and the CMR sections illustrated in FIG. 8.

According to the example illustrated in FIG. 11, each of the SMR sections #n+2 and #n+3 is allocated as an SMR storage area, and each of the CMR sections #m and #m+4 is allocated as a CMR storage area. In addition, each of the areas between the CMR section #m and the SMR section #n+2 and between the SMR section #n+3 and the CMR section #m+4 corresponds to the unused area 80.

FIG. 11 illustrates a moving route of the magnetic head 22 when a plurality of access commands are executed in the same order as their reception timings. More specifically, FIG. 11 illustrates the execution order during the execution of the access command that designates the CMR section #m as the access destination. This situation arises after the controller 30 has received access commands that designate the CMR sections #m and #m+4 and the SMR sections #n+2 and #n+3 as access destinations in this order and before the controller 30 performs the reordering operation. According to such execution order, it may take a lot of time to execute these four access commands because the magnetic head 22 reciprocates many times in the radial direction, which significantly increases the total moving distance of the magnetic head 22.

The controller 30 changes the execution order of the four access commands through a series of operations illustrated in FIG. 10. More specifically, the controller 30 determines a new execution order in a manner that will be described below.

During the execution of the access command that designates the CMR section #m as the access destination, the controller 30 identifies that the current location of the magnetic head 22 is accessing a CMR section that has been allocated as a CMR storage area. Therefore, the controller 30 unifies the section numbers of the sections to be accessed in accordance with the access commands that designate the CMR sections #m and #m+4 and the SMR sections #n+2 and #n+3 as access destinations, into the numerical information on the CMR scale.

A concrete description will be given of a process of unifying the section numbers of sections to be accessed. To facilitate understanding, an SMR section #n and the CMR section #m, both of which are positioned at the same location in the radial direction, are used as references. In this case, both n and m are set to 0. Therefore, the sections to be accessed in accordance with the four access commands are the CMR sections #0 and #4 and the SMR sections #2 and #3.

Of the destinations to be accessed in accordance with the four access commands, the CMR sections #0 and #4 do not need to be converted because their section numbers are numerical information on the CMR scale. Of the destinations to be accessed in accordance with the four access commands, however, the SMR sections #2 and #3 are converted by the controller 30.

According to the example illustrated in FIG. 8, R1 is determined to be 7/9. Thus, the controller 30 converts each of the section numbers of the SMR sections #2 and #3 into the numerical information on the CMR scale by multiplying each section number by 7/9 in accordance with equation (3).

The controller 30 obtains 1.56 as converted numerical information by converting the section number "2" of the SMR section #2 through the calculation using equation (3). Likewise, the controller 30 obtains 2.33 as converted numerical information by converting the section number "3" of the SMR section #3 through the calculation using equation (3).

In the above way, the controller 30 can acquire the section numbers of the CMR sections #0 and #4 and the SMR sections #2 and #3 as the numerical information on the CMR scale. More specifically, the controller 30 obtains 0 and 4, respectively, as the numerical information on the CMR scale for the CMR sections #0 and #4 and also obtains 1.56 and 2.33, respectively, as the numerical information on the CMR scale for the SMR sections #2 and #3.

Section numbers unified into numerical information on the CMR scale can be regarded as representing the locations of corresponding sections. The controller 30 determines the execution order of the four commands, based on the section numbers unified into the numerical information on the CMR scale. More specifically, the controller 30 sets the starting point to the location of the CMR section #0 because the CMR section #0 is present at the location "0" on the CMR scale at which the magnetic head 22 is currently positioned. The controller 30 then sequentially selects the sections to which the magnetic head 22 can move at one time in the shortest distance from among the CMR section #4 present at the location "4" on the CMR scale, the SMR section #n+2 expected to be present at the location "1.56" on the CMR scale, and the SMR section #n+4 expected to be present at the location "2.33" on the CMR scale. In this way, the controller 30 can derive the route of the magnetic head 22 which starts from the CMR section #0, passes through the SMR sections #2 and #3, and ends in the CMR section #4. The controller 30 changes the execution order of the four access commands so that the magnetic head 22 moves along this route. FIG. 12 illustrates the execution order of the four access commands which has been changed by the reordering operation performed in the above manner.

As a result, the total moving distance of the magnetic head 22 obtained is shortened compared to the route of the magnetic head 22 illustrated in FIG. 11. Therefore, the total time required to execute the four access commands becomes shorter than the total time before the reordering operation.

Next, a technique to be compared with the first embodiment will be described. The technique to be compared with the first embodiment will be referred to as a comparative example. According to the comparative example, a controller identifies access destinations in units of tracks and then determines the execution order of the plurality of access commands, based on the identified locations in units of tracks.

It, however, takes a relatively long time to identify access destinations in units of tracks. According to the comparative example, the reordering operation therefore involves a lot of time.

In contrast with the above, according to the first embodiment, a controller identifies access destinations in units of the memory areas having a size of a band in which a plurality of tracks are disposed, namely, in units of sections. The controller then determines the execution order of a plurality of access commands, based on the identified locations in units of sections.

The identification of locations in units of sections is simpler than the identification of locations in units of tracks. According to the first embodiment, the time required for the reordering operation therefore can be shortened compared with the comparative example.

Even when an SMR storage area and a CMR storage area are present together on the recording surface 50 of the magnetic disk 11, it is possible to obtain location information on a unified scale regarding the location of a section by making a simple conversion of a section number with the ratio R1. Therefore, even when an SMR storage area and a CMR storage area are present together on the recording surface 50 of the magnetic disk 11, it is possible to perform the reordering operation in a short time.

According to the first embodiment, as described above, the controller 30 defines, as an SMR storage area, one or more SMR sections out of a plurality of SMR sections obtained by dividing the recording surface 50 in the radial direction in units of memory areas, in each of which data having a band size can be stored by the SMR method. In addition, the controller 30 defines, as a CMR storage area, one or more CMR sections out of a plurality of CMR sections obtained by dividing the recording surface 50 in the radial direction in units of the memory areas, in each of which data having a band size can be stored by the CMR method. The controller 30 provides each of the SMR sections with numerical information on the SMR scale corresponding to the sequence in which the plurality of SMR sections are arranged in the radial direction. In addition, the controller 30 provides each of the CMR sections with numerical information on the CMR scale corresponding to the sequence in which the plurality of CMR sections are arranged in the radial direction. Then, when a plurality of access commands, each of which requests access to one of the SMR storage area and the CMR storage area, are received from the host 40, the controller 30 selects one of the SMR scale and the CMR scale and then converts numerical information of sections to be accessed in accordance with the plurality of access commands into numerical information on the selected scale. After that, the controller 30 executes the plurality of access commands described above in order based on the converted numerical information.

It is therefore possible to reduce the time required for the reordering operation.

According to the first embodiment, the controller 30 makes a conversion into numerical information on a unified scale, based on the ratio between the volumes of data that can be written to a unit area by the SMR method and data that can be written to the unit area by the CMR method.

According to the first embodiment, the controller 30 makes the conversion, based on the ratio of the volume Vsmr of data that can be written in a unit area of the magnetic disk 11 by the SMR method to the volume Vcmr of data that can be written in the same unit region by the CMR method.

Therefore, the conversion is achieved by a simple calculation.

In the above description, the controller 30 makes the conversion based on the ratio R1 of Vsmr to Vcmr. However, the controller 30 may make the conversion, based on the reciprocal of R1, namely, based on the ratio of Vcmr to Vsmr.

In the above description, when performing the conversion process, the controller 30 selects, as a scale to be unified, the scale according to one of an SMR and CMR storage areas which the magnetic head 22 accesses in response to an access command being executed at the timing when a new access command is received.

It should be noted that the timing used as a determination criterion for selecting a scale to be unified is not limited to the timing at which a new access command is received. For example, the controller 30 may select a scale corresponding to a storage area that the magnetic head 22 accesses in response to an access command that has been executed last.

The method of selecting a scale is not limited to the above. Alternatively, the controller 30 may keep selecting one of an SMR and CMR scales.

In the above description, the controller 30 performs the reordering operation every time a new access command is received. However, the trigger point for executing the reordering operation is not limited to the reception of a new access command.

For example, even if a new access command is received after reordering operations have been performed in response to a plurality of access commands, the controller 30 may execute the plurality of access commands in the execution order determined by the reordering operations. After that, the controller 30 may complete the execution of the plurality of access commands and then execute a reordering operation in response to the unexecuted access command.

The reordering operation according to the first embodiment is also applicable to a case where an SMR storage area and a CMR storage area are not present together on the magnetic disk 11. For example, the technique according to the embodiment is applicable to any of cases where the entire recording surface 50 is used as an SMR storage area and where the entire recording surface 50 is used as a CMR storage area.

In any of cases where the entire recording surface 50 is used as an SMR storage area and where the entire recording surface 50 is used as a CMR storage area, the controller 30 operates in a manner that will be described below, for example. The controller 30 divides the recording surface 50 in the radial direction into a plurality of sections and then provides section numbers to the respective sections in accordance with the sequence of these sections arranged in the radial direction. When the entire recording surface 50 is used as an SMR storage area, each section corresponds to a band. When the entire recording surface 50 is used as a CMR storage area, each section has any size as long as each section contains a plurality of tracks 11b. When a plurality of commands are received from the host 40, the controller 30 acquires section numbers of sections to be accessed in accordance with the plurality of commands and then determines the execution order of the plurality of commands, based on the acquired section numbers of the sections to be accessed.

It is therefore possible to reduce the time required for the reordering operation, compared with a case where an access destination is identified in units of tracks.

Second Embodiment

The controller 30 may use an unused area 80 as cache memory.

As described above, an unused area 80 may be formed between an SMR storage area and a CMR storage area because the boundary between SMR sections arranged is misaligned from that between CMR sections arranged. When a magnetic head 22, after having accessed a certain section, is moving to an unused area 80 in order to access another section (referred to as a next section) and to write data thereon, a controller 30 temporarily writes the data on the unused area 80 instead of writing the data on the next section. In this case, it is not necessary to move the magnetic head 22 to the next section, which can contribute to a short total moving distance of the magnetic head 22.

Figure 13:
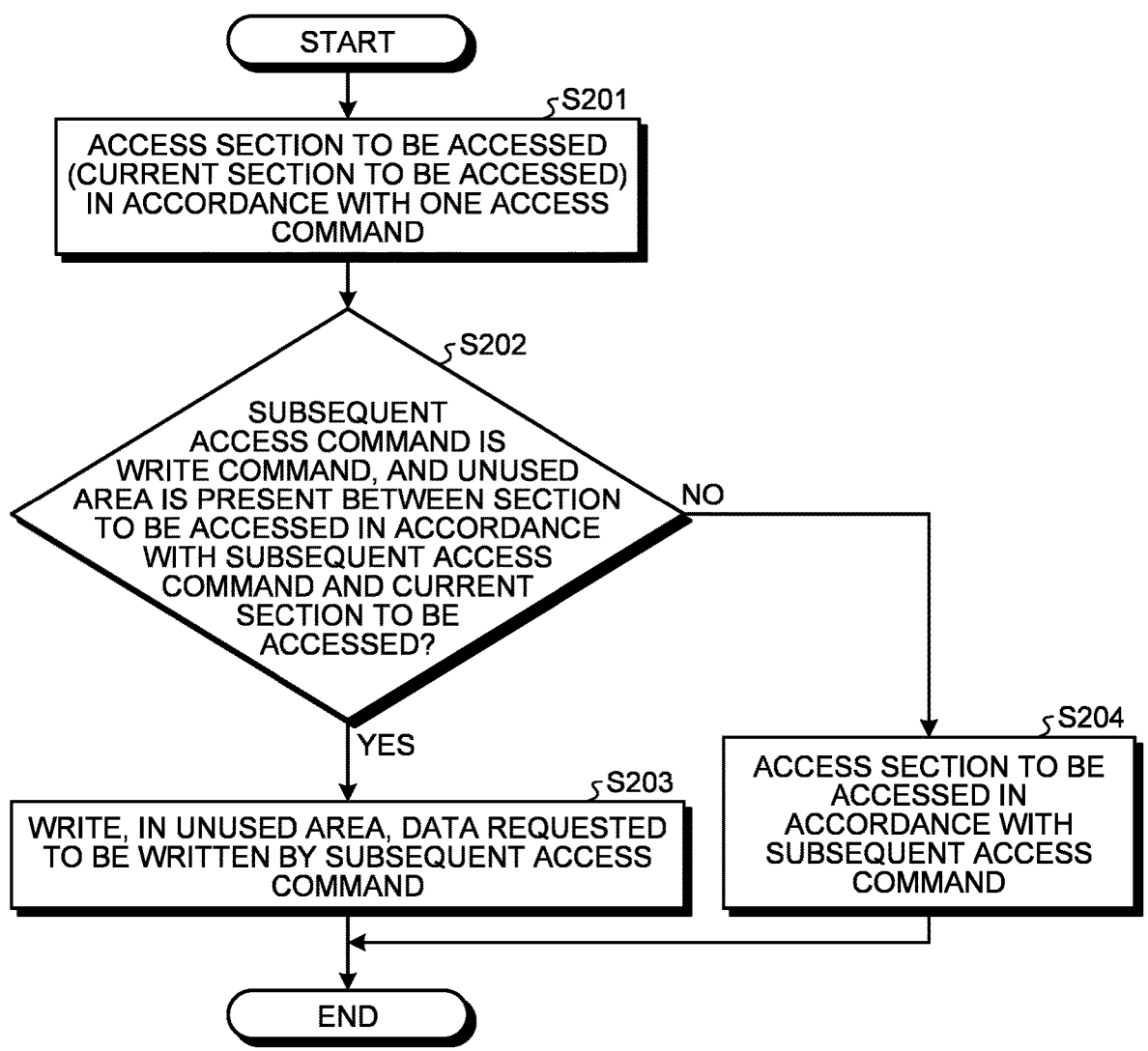
FIG. 13 is a flowchart of a write operation according to a second embodiment.

FIG. 13 is a flowchart of a write operation according to a second embodiment. The controller 30 performs the operation illustrated in this drawing when executing a plurality of access commands in an execution order that has been determined by the reordering operation illustrated in FIG. 10.

The controller 30 uses the magnetic head 22 to access a section to be accessed in accordance with one of a plurality of access commands (S201). This section is referred to as a current section to be accessed in the description with reference to FIG. 13.

The controller 30 determines whether a subsequent access command in the execution order determined by the reordering operation is a write command and whether an unused area 80 is present between a section to be accessed in accordance with the subsequent access command and the current section to be accessed (S202).

When the subsequent access command is a write command and an unused area 80 is present between the section to be accessed in accordance with the subsequent access command and the current section to be accessed (S202: Yes), the controller 30 writes, in the unused area 80, the data requested to be written by the subsequent access command (S203).

When the subsequent access command is not a write command or when no unused area 80 is present between the section to be accessed in accordance with the subsequent access command and the current section to be accessed (S202: No), the controller 30 uses the magnetic head 22 to access the section to be accessed in accordance with the subsequent access command (S204).

After S203 or S204, the controller 30 terminates the series of operations. The access command processed in S201 during the series of operations illustrated in FIG. 13 is an example of a first access command. The subsequent access command in the execution order determined by the reordering operation is an example of a second access command.

According to the second embodiment, as described above, when an unused area 80 is present between a section to be accessed in accordance with a certain access command and a section to be accessed in accordance with a subsequent access command in the execution order determined by a reordering operation and when the subsequent access command is a write command, the controller 30 writes, in the unused area 80, data requested to be written by the subsequent access command.

Consequently, it is possible to shorten the total moving distance of the magnetic head 22, thereby improving the efficiency of executing a plurality of access commands.

At a predetermined timing, the controller 30 transfers the data that has been written in the unused area 80 to a section that has been originally designated as an access destination by the write command. The designer may optionally set the timing of the data transfer.

A recording technique used to write data in an unused area 80 may be fixed to either the CMR method or the SMR method. Alternatively, the controller 30 may select a recording technique used to write data in the unused area 80 by any given method.

In addition to data requested by the write command, any other data, such as management data, may be temporarily written.

In the above way, the unused area 80 may be used as cache memory on which data is to be temporarily written.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device connected to a host, the magnetic disk device comprising:
a magnetic disk having a recording surface;
a magnetic head that accesses the recording surface; and
a controller that sets, as a first storage area in which data is to be written by a shingled magnetic recording (SMR) method, one or more first sections out of a plurality of first sections, the plurality of first sections each capable of being written up to a first volume of data by the SMR method, being obtained by dividing the recording surface in a radial direction in units of first memory areas,
the controller that provides each of the plurality of first sections with numerical information on a first scale corresponding to a sequence in which the plurality of first sections are arranged in the radial direction,
the controller that sets, as a second storage area in which data is to be written by a conventional magnetic recording (CMR) method, one or more second sections out of a plurality of second sections, the plurality of second sections each capable of being written up to the first volume of data by the CMR method being obtained by dividing the recording surface in the radial direction in units of second memory areas in each of which,
the controller that provides each of the plurality of second sections with numerical information on a second scale corresponding to a sequence in which the plurality of second sections are arranged in the radial direction, and
the controller that, when a plurality of commands, each of which is a command that requests access to one of the first storage area and the second storage area, are received from the host, i) selects one scale from the first scale and the second scale, ii) converts numerical information, provided to sections to be accessed in accordance with the plurality of commands, into numerical information on a third scale, the third scale corresponding to the selected scale, and iii) executes the plurality of commands in order based on the numerical information, on the third scale, which has been obtained by converting the numerical information provided to the sections to be accessed.

2. The magnetic disk device according to claim 1, wherein the controller makes a conversion into the numerical information on the third scale, based on a ratio between i) quantity of data that can be written in a third memory area by the SMR method and ii) quantity of data that can be written in the third memory area by the CMR method.

3. The magnetic disk device according to claim 1, wherein the selected scale is one of i) the first scale corresponding to the first storage area which has been accessed by the magnetic head at a predetermined timing, or ii) the second scale corresponding to the second storage area which has been accessed by the magnetic head at the predetermined timing.

4. The magnetic disk device according to claim 3, wherein the predetermined timing is a timing at which a new command is received, and
the new command is included in the plurality of commands.

5. The magnetic disk device according to claim 1, wherein when a fourth memory area is present on the recording surface, the controller uses the fourth memory area as cache memory, the fourth memory area being an area set as neither the first storage area nor the second storage area.

6. The magnetic disk device according to claim 2, wherein when a fourth memory area is present on the recording surface, the controller uses the fourth memory area as cache memory, the fourth memory area being an area set as neither the first storage area nor the second storage area.

7. The magnetic disk device according to claim 5, wherein when the fourth memory area is present between sections to be accessed in accordance with a first command and a second command, the first command being one of the plurality of commands, the second command following the first command in an order based on the numerical information on the third scale and when the second command is a write command, the controller writes, in the fourth memory area, data requested to be written by the second command.

8. The magnetic disk device according to claim 6, wherein when the fourth memory area is present between sections to be accessed in accordance with a first command and a second command, the first command being one of the plurality of commands, the second command following the first command in an order based on the numerical information on the third scale and when the second command is a write command, the controller writes, in the fourth memory area, data requested to be written by the second command.

9. The magnetic disk device according to claim 1, wherein the first volume corresponds to a size of a band.

10. The magnetic disk device according to claim 2, wherein
the first volume corresponds to a size of a band.

11. A method of controlling a magnetic disk device connected to a host, the magnetic disk device including a magnetic disk having a recording surface and a magnetic head that accesses the recording surface, the method comprising:
setting, as a first storage area in which data is to be written by an SMR method, one or more first sections out of a plurality of first sections, the plurality of first sections each capable of being written up to a first volume of data by the SMR method, being obtained by dividing the recording surface in a radial direction in units of first memory areas;
providing each of the plurality of first sections with numerical information on a first scale corresponding to a sequence in which the plurality of first sections are arranged in the radial direction;
setting, as a second storage area in which data is to be written by a CMR method, one or more second sections out of a plurality of second sections, the plurality of second sections each capable of being written up to the first volume of data by the CMR, being obtained by dividing the recording surface in the radial direction in units of second memory areas;
providing each of the plurality of second sections with numerical information on a second scale corresponding to a sequence in which the plurality of second sections are arranged in the radial direction; and
in response to receiving a plurality of commands, each of which is a command that requests access to one of the first storage area and the second storage area, from the host, i) selecting one scale from the first scale and the second scale, ii) converting numerical information, provided to sections to be accessed in accordance with the plurality of commands, into numerical information on a third scale, the third scale corresponding to the selected scale, and iii) executing the plurality of commands in order based on the numerical information, on the third scale, which has been obtained by converting the numerical information provided to the sections to be accessed.

12. The method according to claim 11, further comprising making a conversion into the numerical information on the third scale based on a ratio between i) quantity of data that can be written in a third memory area by the SMR method and ii) quantity of data that can be written in the third memory area by the CMR method.

13. The method according to claim 11, wherein
the selected scale is one of i) the first scale corresponding to the first storage area which has been accessed by the magnetic head at a predetermined timing, or ii) the second scale corresponding to the second storage area which has been accessed by the magnetic head at the predetermined timing.

14. The method according to claim 13, wherein
the predetermined timing is a timing at which a new command is received, and
the new command is included in the plurality of commands.

15. The method according to claim 11, wherein
a fourth memory area is on the recording surface,
the method further comprises using the fourth memory area as cache memory, the fourth memory area being an area set as neither the first storage area nor the second storage area.

16. The method according to claim 12, wherein
a fourth memory area is on the recording surface,
the method further comprises using the fourth memory area as cache memory, the fourth memory area being an area set as neither the first storage area nor the second storage area.

17. The method according to claim 15, wherein, the fourth memory area is between sections to be accessed in accordance with a first command and a second command, the first command being one of the plurality of commands, the second command following the first command in an order based on the numerical information on the third scale and the second command being a write command,
the method further comprises writing data in the fourth memory area, the data being requested to be written by the second command.

18. The method according to claim 16, wherein, the fourth memory area is between sections to be accessed in accordance with a first command and a second command, the first command being one of the plurality of commands, the second command following the first command in an order based on the numerical information on the third scale and the second command being a write command,
the method further comprises writing data in the fourth memory area, the data being requested to be written by the second command.

19. The method according to claim 11, wherein
the first volume corresponds to a size of a band.

* * * * *